(12) United States Patent
Pohlmann

(10) Patent No.: US 8,775,706 B2
(45) Date of Patent: *Jul. 8, 2014

(54) MAIN ELECTRONIC DEVICE FOR COMMUNICATING WITHIN A NETWORK AND METHOD FOR OPERATING A MAIN ELECTRONIC DEVICE FOR COMMUNICATING WITHIN THE NETWORK

(71) Applicant: Sony Corporation, Minato-ku (JP)

(72) Inventor: Frank Pohlmann, Fellbach (DE)

(73) Assignee: Sony Corporation, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/765,284

(22) Filed: Feb. 12, 2013

(65) Prior Publication Data

US 2013/0159516 A1  Jun. 20, 2013

Related U.S. Application Data

(63) Continuation of application No. 13/446,653, filed on Apr. 13, 2012, now Pat. No. 8,392,639, which is a continuation of application No. 12/175,739, filed on Jul. 18, 2008, now Pat. No. 8,171,197.

(30) Foreign Application Priority Data

Sep. 7, 2007 (EP) ..................... 07115942

(51) Int. Cl.
*G06F 13/00* (2006.01)
*H04N 5/04* (2006.01)

(52) U.S. Cl.
USPC .......................... 710/109; 348/500

(58) Field of Classification Search
USPC .......................... 710/109; 348/500
See application file for complete search history.

(56) References Cited

U.S. PATENT DOCUMENTS

| 5,835,719 | A | 11/1998 | Gibson et al. |
| 6,049,885 | A | 4/2000 | Gibson et al. |
| 6,502,132 | B1 | 12/2002 | Kumano et al. |
| 6,574,664 | B1 | 6/2003 | Liu et al. |
| 7,378,984 | B2 | 5/2008 | Suzuki et al. |

(Continued)

FOREIGN PATENT DOCUMENTS

| EP | 0 777 357 A2 | 6/1997 |
| EP | 1 322 069 A2 | 6/2003 |
| WO | WO 2007/070291 A1 | 6/2007 |

OTHER PUBLICATIONS

Whole supplement 1: "Consumer Electronics Control (CEC)", Supplement to HDMI Specification, version 1.3a.*

(Continued)

*Primary Examiner* — Paul R Myers
*Assistant Examiner* — Christopher A Daley
(74) *Attorney, Agent, or Firm* — Oblon, Spivak, McClelland, Maier & Neustadt, L.L.P.

(57) ABSTRACT

The present invention relates to a main electronic device for communicating within a network comprising an interface for enabling communication within the network and a controller for sending polling messages via the network to logical addresses via said interface in order to request information from at least one further electronic device.

Figure 2:
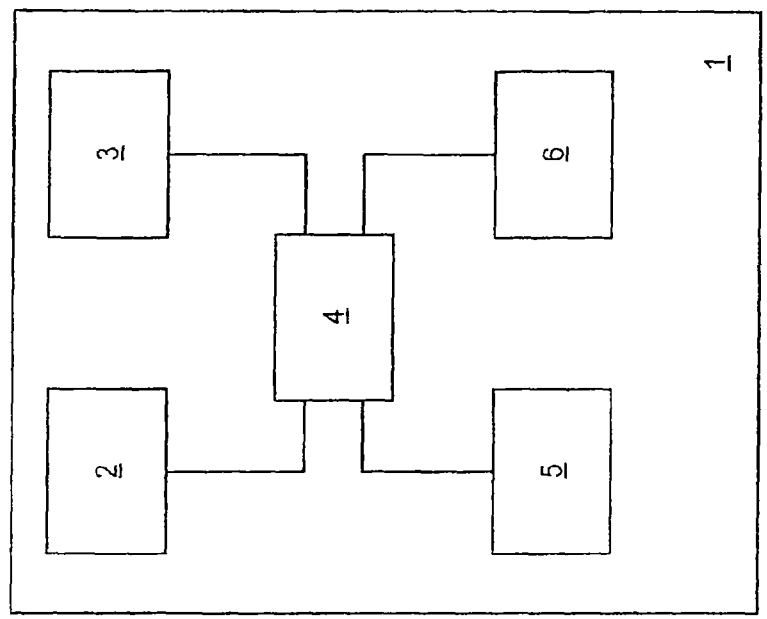

The present invention further relates to a method for operating a main electronic device for communicating within a network.

23 Claims, 3 Drawing Sheets

(56) References Cited

U.S. PATENT DOCUMENTS

| | | |
|---|---|---|
| 7,653,760 B2 | 1/2010 | Maruyama |
| 7,849,218 B2 | 12/2010 | Funabiki et al. |
| 2002/0089427 A1 | 7/2002 | Aratani et al. |
| 2005/0027668 A1 | 2/2005 | Foster et al. |
| 2005/0114086 A1 | 5/2005 | Zielinski et al. |
| 2005/0160162 A1 | 7/2005 | Cromer et al. |
| 2006/0015729 A1 | 1/2006 | Novack et al. |
| 2006/0031895 A1 | 2/2006 | Kwon et al. |
| 2006/0095596 A1* | 5/2006 | Yung et al. .................. 710/5 |
| 2006/0120297 A1 | 6/2006 | Hamedi et al. |
| 2006/0129664 A1* | 6/2006 | Reimert et al. ............. 709/223 |
| 2006/0212911 A1 | 9/2006 | MacMullan et al. |
| 2007/0220150 A1 | 9/2007 | Garg |
| 2008/0151113 A1 | 6/2008 | Park |
| 2008/0170164 A1 | 7/2008 | Park |
| 2008/0271074 A1 | 10/2008 | Bae et al. |
| 2008/0276255 A1 | 11/2008 | Coronado et al. |
| 2009/0051565 A1 | 2/2009 | Yung et al. |
| 2009/0157885 A1 | 6/2009 | Takatsuji et al. |

OTHER PUBLICATIONS

High-Definition Multi Media Interface Specification, Supplement 1 Consumer eLECTRONICS cONTROL (cec), 2007, HDMI Licensing LLC, version 1.3a.*

Second Office Action issued Nov. 27, 2012 in Chinese Application No. 200810173709.6, Serial No. 2012112200855570 (with English translation).

HDMI Licensing, LLC, High-Definition Multimedia Interface, Nov. 10, 2006, Version 1.3a.

High-Definition Multimedia Interface Specification, Version 1.1, Hitachi et al, May 20, 2004.

Whole Supplement 1: "Consumer Electronics Control (CEC)", Supplement to HDMI Specification Version 1.3a, 2007.

* cited by examiner

MAIN ELECTRONIC DEVICE FOR COMMUNICATING WITHIN A NETWORK AND METHOD FOR OPERATING A MAIN ELECTRONIC DEVICE FOR COMMUNICATING WITHIN THE NETWORK

CROSS-REFERENCE TO RELATED APPLICATIONS

This application is a continuation application of, and claims the benefit of priority under 35 U.S.C. §120 from, U.S. application Ser. No. 13/446,653, filed Apr. 13, 2012, the entire contents of which are incorporated herein by reference. U.S. application Ser. No. 13/446,653 is a continuation of U.S. application Ser. No. 12/175,739, filed Jul. 18, 2008 (now U.S. Pat. No. 8,171,197 B2) and claims the benefit of priority under 35 U.S.C. §119 from European Patent Application No. 07115942.0, filed Sep. 7, 2007.

The present invention relates to a main electronic device for communicating within a network and to a method for operating a main electronic device for communicating within a network. Specifically, the present invention relates to the field of requesting information from devices connected by a network.

In general, electronic devices are used in a wide field of applications. Such electronic devices may for example be a personal computer, a television, a video recorder, a DVD or HDD recorder, facsimile devices, digital cameras, mobile terminals for wireless communication or other electronic consumer devices. An important task in developing electronic devices is to enable the devices to be connected to a network or to other electronic devices and to communicate with each other.

When connecting electronic devices either directly or via a network it is important to know which electronic devices presently are connected and to request information on the status and type of the connected electronic devices.

It is therefore the object of the present invention to provide a main electronic device as well as a method for operating a main electronic device enabling to request information from further electronic devices connected by a network.

This object is solved by a main electronic device for communicating within a network according to claim 1 and by a method for operating a main electronic device for communicating within a network according to claim 1 and by a method for operating a main electronic device for communicating within a network according to claim 11.

The present invention relates to a main electronic device for communicating within a network comprising an interface for enabling communication within the network and a controller for sending polling messages via the network to logical addresses via said interface in order to request information from at least one further electronic device.

The present invention further relates to a method for operating a main electronic device for communicating within a network comprising the steps of enabling communication within the network and sending polling messages via the network to logical addresses via said interface in order to request information from at least one further electronic device.

Preferably, the controller is adapted to send the polling messages after switching the main electronic device on.

Further, preferably, the controller is adapted to send the polling messages after enabling the communication functionality, preferably after enabling the consumer electronics control CEC function, of the main electronic device.

Further, optionally, the controller after enabling the communication functionality of the main device and before sending the polling messages is adapted to send enable messages to each of the further electronic devices for enabling communication functionality, preferably for enabling the consumer electronics control CEC function, of each of the further electronic devices.

Advantageously, the controller is adapted to repeatedly send the polling messages.

In a preferred embodiment the controller is adapted to send the polling messages at predefined time intervals.

Preferably, the controller is adapted to send the polling messages to all logical addresses within the network except the logical address occupied by the main electronic device.

Advantageously, the controller is adapted to poll the logical addresses in a predefined order.

Preferably, the controller is adapted to poll the logical address first which is less likely to be occupied by an electronic device.

In a preferred embodiment, the controller is adapted to poll the logical addresses within a CEC network in the order from logical address 14 to logical address 0.

Figure 1:
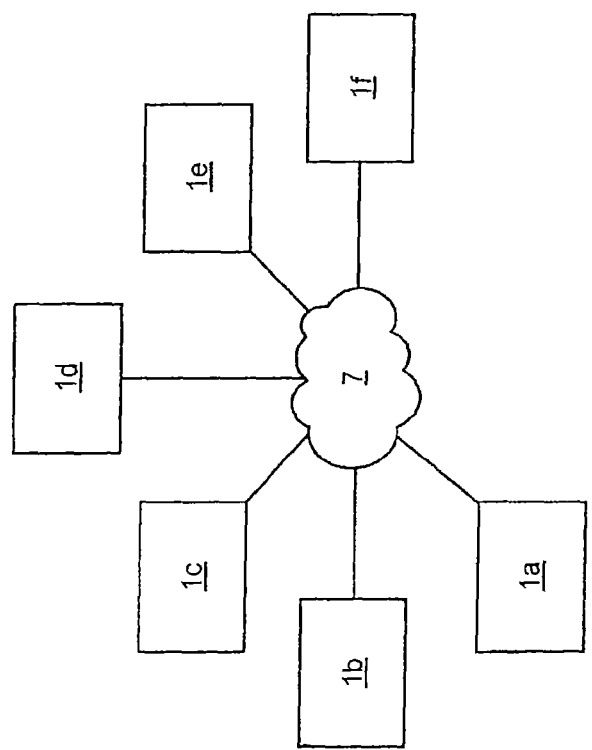
Figure 3B:
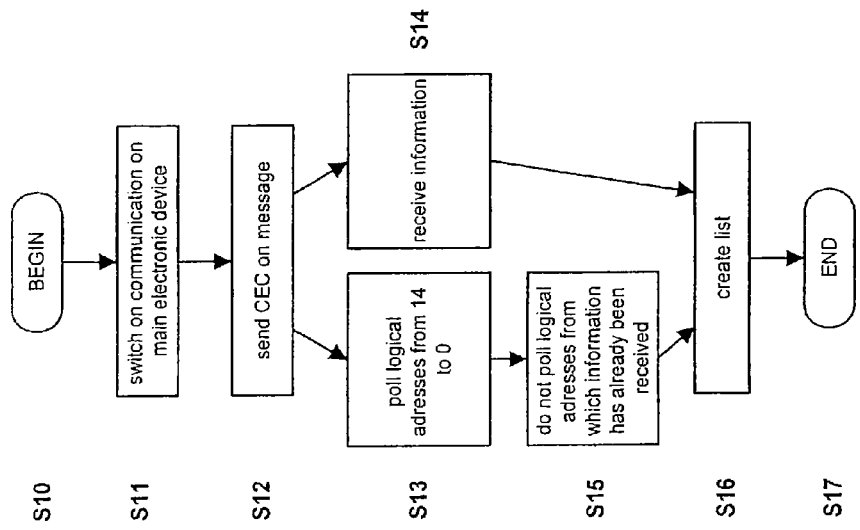
Figure 3A:
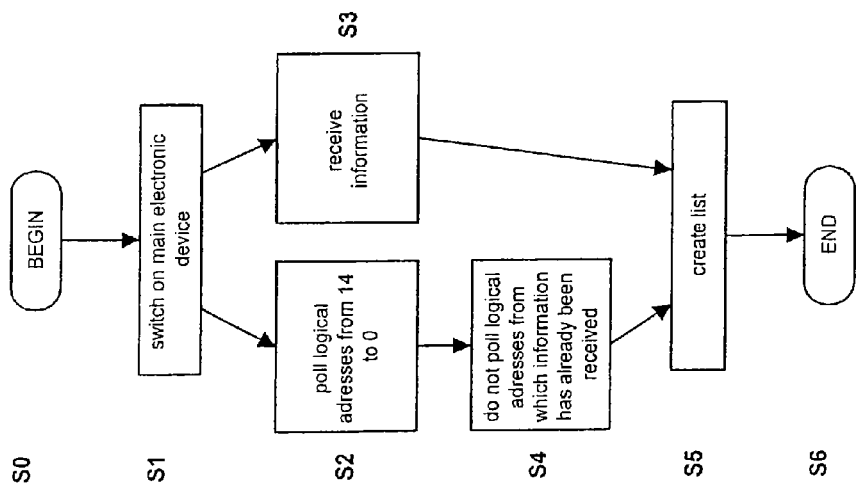
Figure 4:
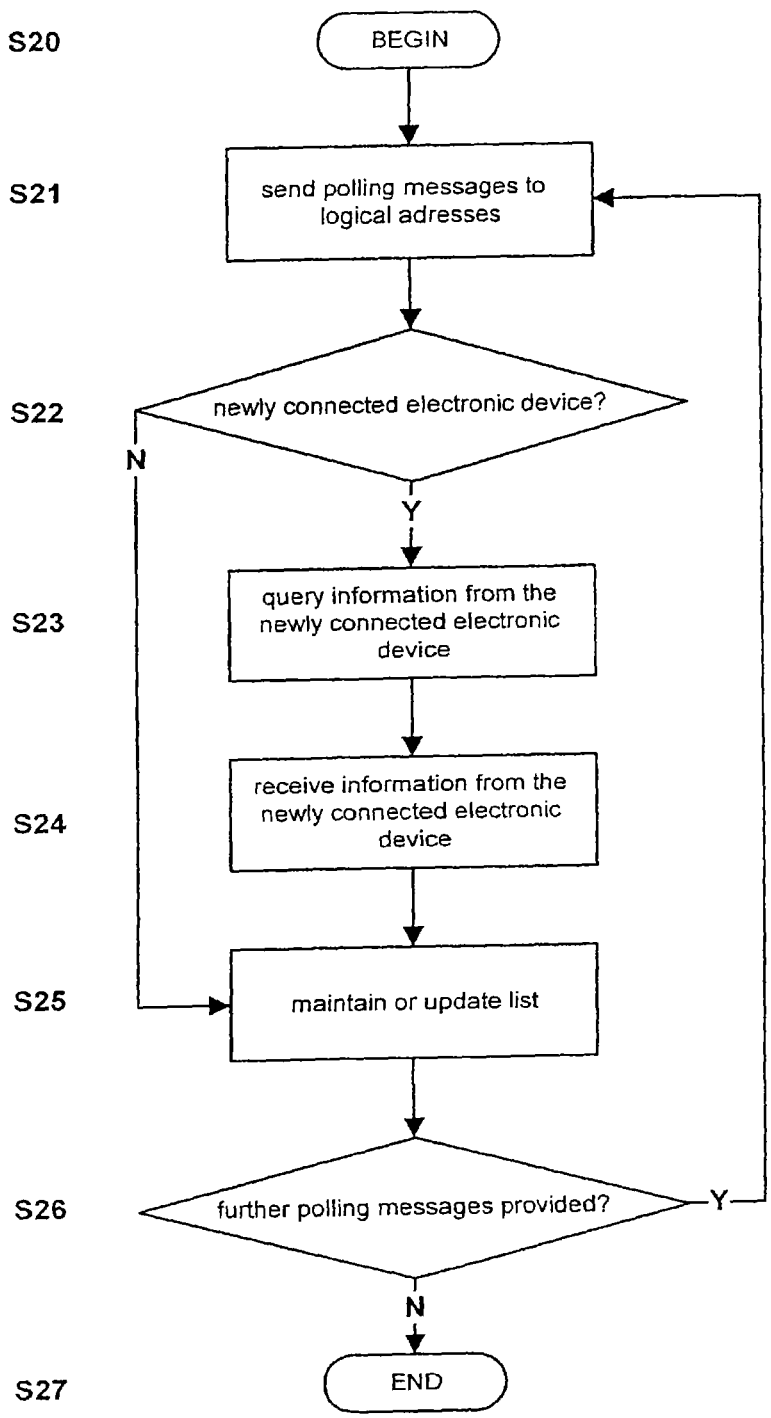

The present invention will now be explained in more detail in the following description of preferred embodiments in relation to the enclosed drawings in which FIG. 1 shows a network comprising a main electronic device according to the present invention, FIG. 2 shows a schematic block diagram of a main electronic device according to the present invention, FIGS. 3a and 3b are flow charts showing the process step of a first method according to the present invention and FIG. 4 is a flow chart showing the process steps of a second method according to the present invention.

FIG. 1 shows several electronic devices 1a to 1f which are connected by a network 7. In a preferred embodiment the communication within the network 7 is accomplished according to the consumer electronics control (CEC) standard. According to the present invention the network comprises several logical addresses which the electronic devices 1a to 1f obtain. Hereby, one of the electronic devices is a main electronic device 1 as will be further described in the following description.

The main electronic device 1 creates, holds and updates a list of all further electronic devices connected to the different logical addresses of the network 7. The functionality of the main electronic device is defined during the production process by the manufacturer. Since the list of connected electronic devices should always be up to date, the present invention provides several possibilities to update the list of the electronic devices connected to the network 7.

In case that the network 7 bases on the CEC standard, the main electronic device preferable is a television and the connected further electronic devices may be for example a recording device, a playback device, a tuner, and audio system or the like. The television functioning as main electronic device 1 can be adapted to show the list of the connected further electronic devices on the display within a graphical user interface (GUI).

FIG. 2 is a schematic block diagram showing the elements of a main electronic device 1 according to the present invention. The main electronic device comprises an input means 2 for enabling input of data and/or information by a user. The input means 2 herefore may be a keyboard, a mouse, a touchpad, recognition of speech, an interface for receiving data input over a remote controller, for example a infrared interface, or any other interface enabling the user to input data and/or information are to select application programs. In addition, the main electronic device 1 comprises an output means 3 for outputting data and/or information to a user. The output means 3 herefore may be a display, light emitting diodes (LED), a loud speaker or any other graphical user interface adapted to output data and/or information to the user.

A memory 5 is further provided for temporally or permanently storing data, information, programs, applications and the like. The memory 5 hereby may be divided into different memory spaces each providing different types of memory, e. g. a random access memory RAM, a flash memory or other types.

The input means 2, the output means 3 and the memory 5 are all connected to and in data communication with a controller 4. The controller 4 hereby controls and supervises the transmission and processing of data and/or information within the main electronic device 1. The controller 4 further supervises the operation of the main electronic device 1.

In addition the main electronic device 1 comprises an interface 6 enabling a communication of the main electronic device 1 via the network 7 with at least one further electronic device 1a to 1f. The interface 6 hereby can be adapted to enable a wireless or wired connection within the network 7. Alternatively, the interface 6 may comprise a multitude of interfaces each being adapted to communicate with a different further electronic device. The interface 6 is also connected to and in data communication with the controller 4. The main electronic device 1 via the interface 6 specifically is enabled to send messages to logical addresses within the network independently if an electronic device is connected to said logical address or not.

In order to keep an overview which electronic devices are at present connected to the network 7 the present invention proposes several methods. The main idea is that the main electronic device 1 via the interface 6 is enabled to communicate with the connected electronic devices. The controller 4 herefore via the interface 6 sends polling messages via the network 7 in order to request information from electronic devices which are connected to the network 7. Such information may comprise the mere information that the electronic device is present or may also comprise further status information, e. g. information on the type, state and so forth of the further electronic device. Such information may further comprise the device type, physical address, vendor ID, menu language setting and OSD name.

The present invention hereby covers two scenarios. The first case is that all devices or at least the main electronic device 1 are switched off. In case that the main electronic device 1 is switched on or that the interface 6 and thereby the communication function of the main electronic device 1 is enabled, the present invention provides a possibility to create a list of all electronic devices that are connected to the network 7 thereby reducing the communication over the network 7.

In the second case, where the main electronic device 1 is already switched on and a further electronic device is connected to the network 7, then the present invention provides an effective method of updating the list comprising all electronic devices connected to the network 7.

FIGS. 3a and 3b show flow charts showing the process steps according to the first scenario of the present invention. FIG. 3a hereby shows a flow chart with the process steps in case that the main electronic device 1 and optionally also other electronic devices within the network are switched on, e. g. are powered on. FIG. 3b shows the case that the main electronic device 1 and the further electronic devices are already switched on and that the communication functionality, which in the present example is a CEC function is switched on in the main electronic device.

The process according to FIG. 3a begins in step S0. In the first step S1 the main electronic device 1 is switched on, e. g. the power supply is switched on. In this case, two processes will start. The first process is that the main electronic device 1 will send polling messages to all logical addresses within the network 7 in order to request status information from connected electronic devices. The second process is that each electronic device connected to the network 7 may automatically start to send information to the main electronic device 1. This may result in a high traffic on the network 7, on the interface 6 of the main electronic device 1 and on all buses provided within the network 7. Specifically, this may result in unnecessary traffic within the network 7, since the main electronic device 1 may send a polling message to a logical address and the electronic device connected to this logical address may send automatically information regarding the status.

The present invention in order to reduce the traffic on the bus therefore proposes to send the polling messages to the logical addresses in a predefined order which allows to reduce the traffic within the network 7. Specifically, the present invention proposes that the main electronic device 1 polls the logical address first which is less likely to be occupied by an electronic device. That is to say that in case that electronic devices are connected to the network 7, there is a certain order how the electronic devices occupy the logical addresses. For example, within a CEC network where there are provided logical addresses from 0 to 14, the electronic devices will first occupy logical addresses having a lower number. The present invention therefore proposes to poll logical addresses first having a higher number and which are less likely to be occupied by an electronic device. Specifically, the present invention proposes within a CEC network to poll the logical addresses from the higher address to the lower address, e. g. to poll the logical addresses from 14 to 0.

This is shown in FIG. 3a as steps S2 and S3. These steps are executed concurrently, that is the main electronic device 1 in step S2 polls the logical addresses in the order from 14 to 0 and at the same time receives information in step S3 sent from electronic devices via the network. Since the main electronic device 1 polls the logical addresses in an order being contrary to the probability that the logical address is occupied by an electronic device crossing messages and double messages as explained above are avoided. Since CEC electronic devices take logical addresses nearer to 0 with a higher possibility they are according to the present invention polled later than they would be with the usual device discovery. This gives the electronic devices connected to the network 7 a higher possibility to report there existence before they are polled.

In the next step S4 the main electronic device checks whether it has already received information from some of the electronic devices connected to the network 7. In case the main electronic device 1 has already received information from some of the electronic devices then the according logical addresses are not polled even if until now they have not been polled.

Thereby unnecessary polling messages can be avoided. The main idea is therefore that the electronic devices connected with the network have the chance to report information about themselves before they are requested to do so by the polling messages send by the main electronic device 1. Redundant messages and therefore higher bus traffic can be avoided with higher possibility with the proposed advanced device discovery. Because sending and receiving messages is the most time consuming task during device discovery it is possible to reduce the time needed to finish the device discovery if the amount of messages to be sent or received is reduced. If the device discovery can be finished earlier it is also possible to show information about the connected electronic devices to the user earlier.

In step S5 the main electronic device 1 then creates a list of all further electronic devices connected to the network 7. The process ends in step S6, e. g. with switching off the main electronic device.

FIG. 3b shows the method in the case that the main electronic device is already switched on but that the communication function has not yet been switched on. The process begins in step S10. In step S11 the communication functionality, in the present example the CEC functionality is switched on within the main electronic device 1. In the next step S12 the main electronic device will then send a CEC on message via the network 7 in order to cause the electronic devices connected to the network 7 to also switch on the communication or CEC functionality. This step S 12 depending on the used communication standard can also be omitted. In the next process steps S13 and S14 polling messages are sent to the logical addresses and information is received from the further electronic devices connected to the network 7 as it was already explained with respect to FIG. 3a.

This further steps S15 to S17 correspond to the steps S4 and S6 as already explained in FIG. 3a. In any case the main electronic device 1 is not polling the own logical address.

After the list is created there is the problem that a newly connected electronic devices may not be detected. With reference to FIG. 4 a method overcoming this problem according the present invention is therefore described. The process begins in step S20 and in the first step S21 the main electronic device sends polling messages to one, some or all logical addresses within the network 7. Hereby, it is possible, that the main electronic device 1 sends polling messages only to those logical addresses where until now no electronic devices have been detected.

In the next step S22 the controller 4 of the main electronic device 1 checks whether a newly connected electronic device has been detected that is whether an answer has been received after the polling message. In case that the a newly connected electronic device has been detected then in the next step S23 further information can be queried from the newly connected electronic device, e. g. the status, type and the like of the electronic device.

In the next step S24 this queried information from the newly connected electronic device is received and in the next step S25 the list of electronic devices connected to the network 7 is updated. Otherwise, if in step S22 no newly connected electronic device is detected, then the process continuous with step S25 where the list is either updated or maintained as previously.

In the next step S26 the controller 4 checks whether further polling messages are provided. In case that further polling messages are provided, the process goes back to step S21 where polling messages are sent to logical addresses. Otherwise, if in step S26 it is decided that no further polling messages are provided then the process ends with step S27. Hereby, a predefined time interval may be kept between sending the polling messages, e. g. the polling messages may only be sent every 10 seconds in order to reduce the traffic within the network 7. A value of 10s would be a compromise between the detection time of a connection or disconnection of an electronic device and the bus traffic.

It is to be noted that the above explained method can also be used to detect newly disconnected devices. In case that after sending a polling message to a previously occupied logical address no answer is received, then the main electronic device 1 will know that the respective logical address is not occupied any more and will remove the respective electronic device from the list.

The above method enables a simplified connection and disconnection of electronic devices. The user just has to connect an electronic device and it will automatically be detected and installed, e.g. all device information will be available. On the other hand the user just has to disconnect an electronic device and it will be automatically removed from the list.

The present invention with the described methods provides a wide field of possibilities how to create and constantly update a list of electronic devices connected by a network 7. The list can be shown on a graphical user interface thereby enabling the user to always keep an overview of the electronic devices and to be enabled to control the connected electronic devices.

The invention claimed is:

1. An electronic device comprising:
an interface configured to
communicate with at least one other electronic device within a network;
send a first round of polling messages via the network to logical addresses within the network; and
send a second round of polling messages to at least a subset of the logical addresses within the network, wherein a number of polling messages sent in the second round of polling messages is smaller than a number of polling messages sent in the first round of polling messages.

2. The electronic device according to claim 1, wherein
the interface is configured to send the first round and the second round of polling messages after switching the electronic device on.

3. The electronic device according to claim 1, wherein
the interface is configured to send the first round and the second round of polling messages after enabling a consumer electronics control CEC function of the at least one other electronic device.

4. The electronic device according to 3, further comprising:
a controller configured to enable a communication functionality of the device, wherein
the interface is configured to send enable messages to the at least one other electronic device enabling the consumer electronics control CEC function of the at least one other electronic device before sending the first round and the second round of polling messages and after the communication functionality of the device has been enabled.

5. The electronic device according to claim 1, wherein
the interface is configured to send additional rounds of polling messages after sending the first round and the second round of polling messages.

6. The electronic device according to claim 1, wherein
the interface is configured to send the first round, the second round and subsequent rounds of polling messages at predefined time intervals.

7. The electronic device according to claim 1, wherein
the interface is configured to first send a polling message to a logical address having a lowest probability of being occupied by an electronic device.

8. The electronic device according to claim 1, wherein
the interface is configured to send at least one of the first round of the polling messages and the second round of the polling messages in a predefined order.

9. The electronic device according to claim 1, wherein
the network is a consumer electronics control (CEC) network.

10. The electronic device according to claim 1, wherein the polling messages sent in the first round and the second round of polling messages request information from the at least one other electronic device.

11. The electronic device according to claim 1, wherein the interface is configured to send at least one of the first round of the polling messages and the second round of the polling messages excepting a logical address occupied by the electronic device.

12. The electronic device according to claim 1, wherein the interface is configured to send the first round of the polling messages and the second round of the polling messages excepting a logical address occupied by the electronic device.

13. The electronic device according to claim 1, wherein the interface is configured to send at least one of the first round of the polling messages and the second round of the polling messages excepting a logical address from which information has already been received.

14. A method for operating a electronic device, the method comprising:
performing communication within a network;
sending a first round of polling messages via the network to logical addresses within the network via an interface; and
sending a second round of polling messages to at least a subset of the logical addresses within the network, wherein a number of polling messages sent in the second of polling messages round is smaller than a number of polling messages sent in the first round of polling messages.

15. The method according to claim 14, wherein the first round and the second round of polling messages are sent after switching the electronic device on.

16. The method according to claim 14, wherein the first round and the second round of polling messages are sent after enabling a consumer electronics control CEC function of the electronic device.

17. The method according to claim 16, further comprising:
sending enable messages to the at least one other electronic device to enable the consumer electronics control CEC function of the at least one other electronic device after enabling a communication functionality of the device and before sending the first round and the second round of polling messages.

18. The method according to claim 14, further comprising:
sending additional rounds of polling messages after sending the first round and the second round of polling messages.

19. The method according to claim 14, wherein the first round, the second round and subsequent rounds of polling messages are sent at predefined time intervals.

20. The method according to claim 14, wherein the sending the first round of polling messages includes first sending a polling message to a logical address having a lowest probability of being occupied by an electronic device.

21. The method according to 14, further comprising:
displaying a list of the at least one other electronic device.

22. The method according to claim 14, wherein at least one of the sending the first round of polling messages and sending the second round of polling messages includes sending the polling messages in a predefined order to each of the logical addresses within the network excepting a logical address occupied by the electronic device and at least one additional logical address.

23. A non-transitory computer-readable medium including computer-program instructions, which when executed by an electronic device, cause the electronic device to:
perform communication within a network;
send a first round of polling messages via the network to logical addresses within the network via an interface; and
send a second round of polling messages to at least a subset of the logical addresses within the network, wherein a number of polling messages sent in the second of polling messages round is smaller than a number of polling messages sent in the first round of polling messages.

* * * * *